United States Patent Office 2,767,228
Patented Oct. 16, 1956

2,767,228

METHOD OF CONDUCTING HYDROCARBON REACTIONS

Robert M. Kennedy, Newtown Square, and Abraham Schneider, Philadelphia, Pa., assignors to Sun Oil Company, Philadelphia, Pa., a corporation of New Jersey No Drawing. Application June 11, 1951,
Serial No. 231,052

17 Claims. (Cl. 260—666)

This invention relates to reactions involving isoparaffins, cyclic fluorides, and boron trifluoride, and is particularly directed to a method for conducting hydrocarbon reactions for the preparation of naphthenes and alkyl substituted naphthenes.

In an application for Letters Patent of the United States filed July 10, 1948 (Serial No. 38,167), now Patent No. 2,557,113, there is described and claimed reactions of isoparaffins catalyzed by the combination of $BF_3$ and an alkyl fluoride to form other isoparaffins. In application Serial No. 86,527, filed April 9, 1949, now Patent No. 2,557,116, there is described and claimed the self-alkylation of isobutane catalyzed by the combination of $BF_3$ and an alkyl fluoride, and in application Serial No. 114,795, filed September 9, 1949, now Patent No. 2,557,117, there is described and claimed the self-alkylation of isopentane catalyzed by the same catalytic combination.

It has now been found that the use of cycloalkyl fluorides having 5 or 6 carbon atoms in the ring in place of alkyl fluorides in reactions otherwise similar to those of the mentioned patent applications gives reactions entirely different and unpredictable from the reactions described therein. Thus, it has been found that bringing together a cycloalkyl fluoride and $BF_3$ in the presence of an isoparaffin hydrocarbon having at least one tertiary hydrogen atom per molecule establishes a catalytic condition effective to cause the isoparaffin and the cyclic fluoride to react to form a polyalkyl substituted cyclohexane, and also effective to cause simultaneous dimerization of the hydrocarbon portion of the cyclic fluoride to form a dimer having a decalin type structure. It is further characteristic of the process of the present invention that a portion of the cyclic fluoride is converted to the corresponding naphthenic hydrocarbon, a portion of which may be isomerized to an isomer thereof.

To illustrate the process of the present invention, by contacting cyclohexyl fluoride and $BF_3$ in the presence of isobutane there are formed in substantial yields tetramethylcyclohexane, dimethyldecalin, and cyclohexane. The cyclic fluoride thus serves both to catalyze the reaction and as a reactant. The mode of operation, reaction variables, and other reactants are described below.

In bringing together the cyclic fluoride and $BF_3$, the cyclic fluoride can be introduced into the isobutane to which $BF_3$ has already been added, or the $BF_3$ can be introduced into a solution of the cyclic fluoride in the isobutane, or the cyclic fluoride and $BF_3$ can be introduced simultaneously but separately into the isobutane. It is also permissible first to dissolve the cyclic fluoride and $BF_3$ in separate portions of isobutane, and then bring together the separate portions to effect reaction. It is not permissible, however, to premix the cyclic fluoride and $BF_3$ and then add the mixture to the isobutane, for in such case the catalytic condition will be immediately spent when the cyclic fluoride and $BF_3$ are brought into contact with each other. No reaction is observed on the separate addition of the cyclic fluoride or $BF_3$ to an isoparaffin; it is only when the cyclic fluoride and $BF_3$ are brought together in the presence of the isoparaffin as above-described, that the present reaction occurs. It appears that the catalytic effect is produced by extraction of the fluorine atom from the cyclic fluoride by the $BF_3$, resulting in the formation of carbonium ions which initiate and enter into the various reactions. The cyclic fluoride thus serves as both a reactant and a catalytic component.

Cycloalkyl fluorides and $BF_3$ are both soluble in isoparaffins and form a homogeneous phase therewith irrespective of their mode of addition, so that reaction does not depend upon contact of separate phases, and hence the mechanical agitation required to provide contact between separate phases is unnecessary. This is a significant advantage over processes involving contact between separate phases, such as hydrocarbon reactions catalyzed by Friedel-Crafts catalysts including for example, aluminum chloride or hydrogen fluoride. It is characteristic of the present process that the reaction occurs instantaneously, i. e. the reaction is complete as soon as the components are mixed. This also is a substantial advantage over processes requiring contact between separate phases in that the size of reactors, because of the rapid throughput which is limited only by practical considerations, is reduced to a minimum.

Upon completion of the reaction, the mixture becomes heterogeneous due to separation of a sludge from the hydrocarbon phase. This sludge may be conveniently separated by physical methods such as decanting or centrifuging. This material contains fluorine derived from the cycloalkyl fluoride together with $BF_3$ in some sort of complex form. On heating the sludge, $BF_3$ and HF are evolved; the $BF_3$ may be recycled and the HF may be used to prepare additional cycloalkyl fluoride for use in the reaction. The final residue may be discarded or used as a fuel.

Isoparaffins which may be employed in the present process are those which have at least one tertiary hydrogen atom per molecule. Isobutane and isopentane are the preferred isoparaffins, but good results are obtained with isoparaffins having up to 30 carbon atoms, although it is presently preferred to use isoparaffins having not more than 20 carbon atoms per molecule. As illustrative of such isoparaffins, good results are obtained with 2-methylpentane; 3-methylpentane; 2-ethylpentane; 2-methylhexane; 3-methylhexane; and the branched chain nonanes, decanes, and their homologues and isomers. It is preferred to employ isoparaffins other than those wherein a quaternary carbon atom is in the beta position relative to the carbon atom to which is attached the tertiary hydrogen atom, such as 2,2,4-trimethylpentane, since such hydrocarbons are substantially inert in the present process and thus act as inert diluents. Mixtures of isoparaffins may also be employed, such as those obtainable from petroleum, the $C_4$–$C_6$ fraction, for example. Normal paraffins are inert in the reaction and if present serve as diluents.

By "tertiary hydrogen atom" is meant a hydrogen atom which is attached to a tertiary carbon atom, i. e. a hydrogen atom which is attached to a carbon atom which is also attached to three other carbon atoms.

The cycloalkyl fluorides which may be employed in the present process are those having either a 5 carbon atom ring or a 6 carbon atom ring, which are the cyclohexyl fluorides and the cyclopentyl fluorides, including cyclohexyl fluoride and cyclopentyl fluoride and alkyl substituted derivatives thereof, such as 2-methylcyclohexyl fluoride; 3-methylcyclohexyl fluoride; 4-methylcyclohexyl fluoride; 1-methylcyclohexyl fluoride; 1-methylcyclopentyl fluoride; 2-methylcyclopentyl fluoride; 1-ethylcyclopentyl fluoride; and homologues and isomers of the described fluorides, such as the ethyl, dimethyl and methylethyl homologues. Preferably, the cyclic fluoride should not have more than 2 alkyl substituents, and not more than a total of 30 carbon atoms per molecule. The described fluorides have the fluorine atom attached to a carbon atom of the naphthene ring, and such fluorides are preferred. It is permissible, however, to have the fluorine atom attached to a carbon atom which in turn is attached to a carbon atom of the naphthene ring, such as fluoromethylcyclopentane, and such fluorides are included in the terms "cyclic fluoride" and "cycloalkyl fluoride." It is believed such fluorides form, under the conditions of the present process, carbonium ions identical to those of the preferred fluorides.

The present cyclic fluorides are conveniently prepared by adding hydrogen fluoride to the cyclic olefin corresponding to the desired cyclic fluoride. For example, adding hydrogen fluoride to cyclohexene gives cyclohexyl fluoride, and adding hydrogen fluoride to cyclopentene gives cyclopentyl fluoride, both of which fluorides are preferred components of the present process.

Although the mechanism of the present reaction is complicated, the overall reaction may be demonstrated by the following equations which are presented to illustrate the process and the principal products obtained:

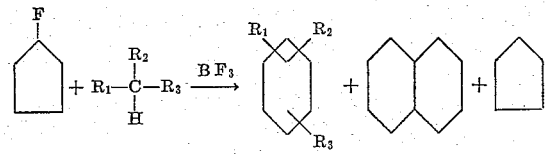

$R_1$, $R_2$, and $R_3$ represent alkyl radicals, preferably of from 1 to 6 carbon atoms each, and may be the same or different radicals. When the cyclopentyl fluoride has one alkyl substituent, the cyclohexane product is a tetraalkyl cyclohexane and the decalin product has two alkyl substituents, in each instance the additional alkyl substituent being identical to the substituent on the cyclic fluoride.

Using cyclohexyl fluoride the reaction may be represented by:

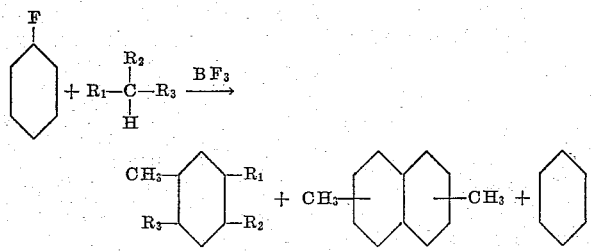

$R_1$, $R_2$, and $R_3$ are the same as above. The methyl radicals attached to the products were derived from the ring of the cyclic fluoride. 1,2,4,5-tetraalkyl cyclohexane is shown as the alkyl substituted cyclohexane product and is prepared in substantial quantities, but it should be understood that isomers thereof, such as the 1,2,3,5-tetraalkyl isomer, are also formed. When the cyclohexyl fluoride has one alkyl substituent, the cyclohexane product is a penta-alkyl cyclohexane and the decalin product has 4 alkyl substituents, in each instance the additional alkyl substituents being identical to the alkyl substituent on the cyclohexyl fluoride.

In carrying out the process of the present invention, the lowest operable temperature depends upon the cyclic fluoride employed. In the preferred case, where the cyclic fluoride is a secondary fluoride, i. e., where the fluorine atom is attached to a secondary carbon atom, such as in cyclohexyl fluoride, the lowest operable temperature is $-90°$ C. With a tertiary fluoride, i. e., where the fluorine atom is attached to a teritiary carbon atom, such as in 1-methylcyclopentyl fluoride, temperatures as low as $-120°$ C. are operable. With a primary fluoride, such as fluoromethylcyclohexane, a temperature of at least $-10°$ C. is required. Regardless of what fluoride is employed the process may be operated at temperatures up to 150° C., but preferably, in all cases, the temperature is maintained from 0° C. to 100° C. When the isoparaffin employed is normally a solid, a temperature sufficient to maintain it as a liquid, up to the described limit, is advantageously employed.

The concentrations of the reaction mixture components may be varied and good results obtained. The mole ratio of isoparaffin to cyclic fluoride should be between 2:1 to 20:1. The quantity of $BF_3$ to employ is not critical, only a small amount, a catalytic quantity, being sufficient to initiate the reaction which then proceeds to completion. However, it is preferred to employ a somewhat larger quantity of $BF_3$ than is required to initiate the reaction, since the resulting reaction is then more sharply defined in the production of the desired products, i. e., the quantity of high boiling products is held to a minimum. It is preferred to employ a quantity of $BF_3$ so that the mole ratio of $BF_3$ to cyclic fluoride is from 0.05:1 to 1:1, but even higher concentrations may be employed if desired.

The present reaction is conducted in the liquid phase. The pressure to employ is advantageously that of the $BF_3$ at the temperature of the reaction. Operating at a temperature within the preferred range with a concentration of $BF_3$ also within the preferred range, the pressure will be from about 100 to 200 p. s. i. g., but may vary from about 10 to 500 p. s. i. g.

The following example illustrates a specific embodiment of the present invention, in which "parts" refers to parts by weight.

*Example*

Into a copper bomb were introduced 100 parts of cyclohexyl fluoride and 300 parts of isobutane. 10.4 parts of $BF_3$ were then introduced giving a pressure of about 125 p. s. i. g., the temperature being 28° C., and the bomb was mildly agitated. The mole ratio of isobutane to cyclohexyl fluoride was 5.05, and the mole ratio of $BF_3$ to the fluoride was 0.171. The pressure rapidly decreased to about 30 p. s. i. g. and the bomb was warmed slightly by the heat of reaction.

The reaction mixture formed two layers which were separated, the lower layer comprising 47.2 parts. The upper layer was distilled and there were recovered 259 parts of isobutane, 19.2 parts of cycloparaffins consisting of about 75% cyclohexane and 25% methylcyclopentane (formed by isomerization of the cyclohexane), 31.7 parts of tetramethylcyclohexane, and 10.6 parts of dimethyldecalins.

The tetramethylcyclohexane product was a mixture of position and geometrical isomers consisting largely of 1,2,4,5-tetramethylcyclohexane, and had a refractive index $n_D^{20} = 1.4379$ and a boiling range of from about 160° C. to 175° C. Based upon the consumption of isobutane, the yield of this product was 50%. The structure was proved by dehydrogenation over platinum on charcoal at 300° C., which gave a mixture of tetramethyl benzenes including a substantial proportion (above 25%) of durene (1,2,4,5-tetramethyl benzene).

The dimethyldecalin product had a refractive index $n_D^{20} = 1.4669$, a boiling range of from about 220° C. to 240° C. and consisted of a mixture of position and geometrical isomers. The product was dehydrogenated as above-described for the tetramethylcyclohexanes to form a mixture of dimethylnaphthalenes.

A high boiling product was also obtained which was apparently dimethyldecalin alkylated with isobutane.

The above example illustrates a preferred embodiment of the present invention. When other reactants are employed, corresponding products are obtained as above-described. For example, if 1-methylcyclohexyl fluoride be substituted for cyclohexyl fluoride in the example, the major products are pentamethylcyclohexanes and tetramethyldecalins.

The polyalkylcyclohexanes prepared in the present process are useful as chemical intermediates in, for example, the preparation of relatively pure substituted aromatic hydrocarbons by dehydrogenation; and the decalins may likewise be so employed to prepare aromatics of the naphthalene series.

In patent application Serial No. 231,054, filed June 11, 1951, there is described and claimed the reactions of cyclopentanes having at least 1 hydrogen atom attached to a nuclear carbon atom by bringing together $BF_3$ and an alkyl fluoride in the presence of the naphthene to form polyalkyl napthenes.

In patent application Serial No. 231,055, filed June 11, 1951, now Patent No. 2,683,754, there is described and claimed the reactions between cyclopentanes having at least 1 tertiary hydrogen atom attached to a nuclear carbon atom and olefins, including cyclo-olefins, by bringing together $BF_3$ and an alkyl fluoride in the presence of a mixture of the cyclopentane and olefin to form branched chain paraffins and alkyl substituted naphthenes.

In patent application Serial No. 231,056, filed June 11, 1951, now Patent No. 2,683,755, there is described and claimed the reactions of cyclopentanes having at least 1 tertiary hydrogen atom attached to a nuclear carbon atom or isoparaffins having at least 1 tertiary hydrogen atom with olefins by bringing together $BF_3$ and a cycloalkyl fluoride in the presence of a mixture thereof to form alkylated and polyalkylated naphthenes.

In patent application Serial No. 231,053, filed June 11, 1951, there is described and claimed the dimerization of cyclopentanes having at least 1 tertiary hydrogen atom attached to a nuclear carbon atom by bringing together $BF_3$ and cycloalkyl fluoride in the presence of the naphthene.

In patent application Serial No. 231,057, filed June 11, 1951, now Patent No. 2,683,756, there is described and claimed the reactions between cyclopentanes having at least 1 tertiary hydrogen atom attached to a nuclear carbon atom and cyclo-olefins by bringing together $BF_3$ and a cycloalkyl fluoride in the presence of a mixture thereof to form the alkylation product of the naphthene and cyclo-olefin and other hydrocarbons.

In patent application Serial No. 231,058, filed June 11, 1951, now Patent No. 2,683,757, there is described and claimed the separation of naphthenes having a ring composed of 5 carbon atoms and at least 1 tertiary hydrogen atom attached to a nuclear carbon atom from naphthenes having a ring composed of 6 carbon atoms by bringing together, in the presence of a mixture thereof, $BF_3$ and an alkyl fluoride or a cycloalkyl fluoride.

The invention claimed is:

1. Method of preparing alkyl substituted naphthenes which comprises forming a reaction mixture consisting of $BF_3$, a cycloalkyl fluoride and at least one non-cyclic saturated hydrocarbon by introducing in liquid homogeneous phase at a temperature of from —90° C. to 150° C., cyclohexyl fluoride into an admixture of $BF_3$ and an isoparaffin having at least 1 tertiary hydrogen atom per molecule to effect instantaneous reaction to form alkyl substituted naphthenes having the same number of carbon atoms as the sum of the carbon atoms of said cyclohexyl fluoride and said isoparaffin, and separating the so-formed alkyl substituted naphthenes from the reaction mixture.

2. Method of preparing alkyl substituted naphthenes which comprises forming a reaction mixture consisting of $BF_3$, a cycloalkyl fluoride and at least one non-cyclic saturated hydrocarbon by introducing, in liquid homogeneous phase at a temperature of from —90° C. to 150° C., $BF_3$ into an admixture of cyclohexyl fluoride and an isoparaffin having at least 1 tertiary hydrogen atom per molecule to effect instantaneous reaction to form alkyl substituted naphthenes having the same number of carbon atoms as the sum of the carbon atoms of said cyclohexyl fluoride and said isoparaffin, and separating the so-formed alkyl substituted naphthenes from the reaction mixture.

3. Method of preparing alkyl substituted naphthenes which comprises forming a reaction mixture consisting of $BF_3$, a cycloalkyl fluoride and at least one non-cyclic saturated hydrocarbon by introducing, in liquid homogeneous phase at a temperature of from —90° C. to 150° C., $BF_3$ into an admixture of cyclohexyl fluoride and isobutane, and separating tetramethylcyclohexane and dimethyl decalin from the reaction mixture.

4. Method of preparing alkyl substituted naphthenes which comprises forming a reaction mixture consisting of $BF_3$, a cycloalkyl fluoride and at least one non-cyclic saturated hydrocarbon by introducing, in liquid homogeneous phase at a temperature of from —90° C. to 150° C., cyclohexyl fluoride into an admixture of isobutane and $BF_3$, and separating tetramethylcyclohexane and dimethyl decalin from the reaction mixture.

5. Method of preparing dimethyldecalins which comprises forming a reaction mixture consisting of $BF_3$, a cycloalkyl fluoride and at least one non-cyclic saturated hydrocarbon by bringing together, in liquid homogeneous phase at a temperature of from —90° C. to 150° C., $BF_3$ and cyclohexyl fluoride in the presence of isobutane, and separating dimethyldecalins from the reaction mixture.

6. Method for the preparation of polyalkyl cyclohexanes which comprises forming a reaction mixture consisting of $BF_3$, a cycloalkyl fluoride and at least one non-cyclic saturated hydrocarbon by bringing together, in liquid homogeneous phase, $BF_3$ and a cycloalkyl fluoride selected from the group consisting of cycloalkyl fluorides having a ring composed of 5 carbon atoms and cycloalkyl fluorides having a ring composed of 6 carbon atoms in the presence of an isoparaffin having at least 1 tertiary hydrogen atom per molecule to effect instantaneous reaction to form polyalkyl cyclohexanes having the same number of carbon atoms as the sum of the carbon atoms of said isoparaffin and the selected cycloalkyl fluoride.

7. Method for the simultaneous preparation of polyalkyl cyclohexanes and decalins which comprises forming a reaction mixture consisting of $BF_3$, a cycloalkyl fluoride and at least one non-cyclic saturated hydrocarbon by bringing together, in liquid homogeneous phase, $BF_3$ and a cycloalkyl fluoride selected from the group consisting of cycloalkyl fluorides having a ring composed of 5 carbon atoms and cycloalkyl fluorides having a ring composed of 6 carbon atoms in the presence of an isoparaffin having at least 1 tertiary hydrogen atom per molecule to effect instantaneous reaction to form polyalkyl cyclohexanes having the same number of carbon atoms as the sum of the carbon atoms of said isoparaffin and the selected cycloalkyl fluoride and to simultaneously form a dimer of the selected cycloalkyl fluoride having a decalin structure.

8. Method according to claim 7 wherein the selected fluoride is a cyclohexyl fluoride.

9. Method according to claim 8 wherein the cyclohexyl fluoride has not more than 30 carbon atoms per molecule.

10. Method according to claim 9 wherein the cyclohexyl fluoride is cyclohexyl fluoride.

11. Method according to claim 10 wherein the isoparaffin is isobutane.

12. Method according to claim 10 wherein the isoparaffin is isopentane.

13. Method according to claim 7 wherein the selected fluoride is a cyclopentyl fluoride.

14. Method according to claim 13 wherein the cyclopentyl fluoride has not more than 30 carbon atoms per molecule.

15. Method according to claim 14 wherein the cyclopentyl fluoride is cyclopentyl fluoride.

16. Method according to claim 15 wherein the isoparaffin is isobutane.

17. Method according to claim 15 wherein the isoparaffin is isopentane.

References Cited in the file of this patent

UNITED STATES PATENTS

| | | |
|---|---|---|
| 2,304,290 | Van Peski | Dec. 8, 1942 |
| 2,358,011 | Ipatieff et al. | Sept. 12, 1944 |
| 2,683,757 | Kennedy et al. | July 13, 1954 |